(No Model.)
J. B. CHRISTOPHER.
JOURNAL BEARING.
No. 593,082. Patented Nov. 2, 1897.
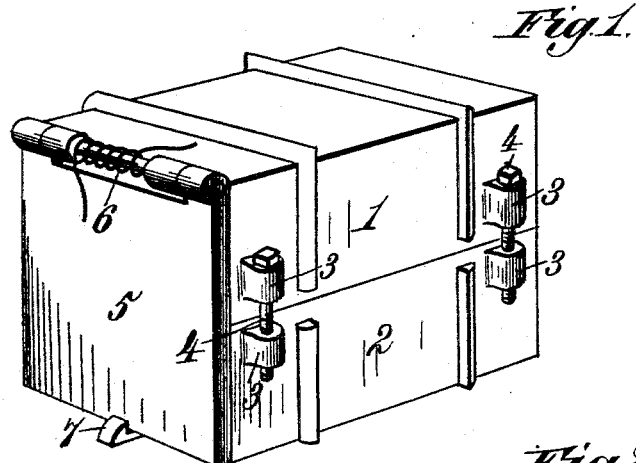
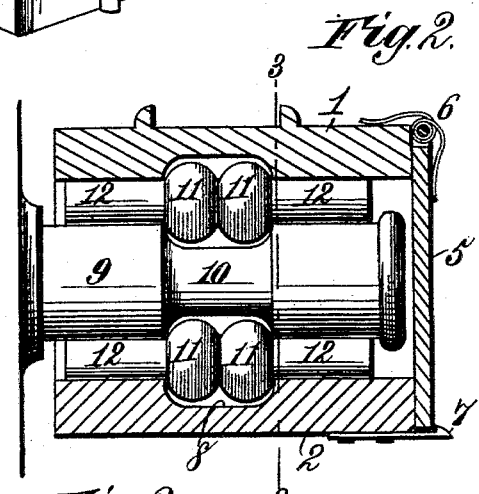
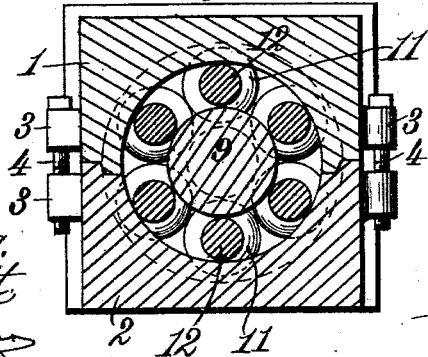
Witnesses.
Inventor.
James B. Christopher.
By James L. Norris.
Att'y.

UNITED STATES PATENT OFFICE.

JAMES B. CHRISTOPHER, OF PERU, ILLINOIS, ASSIGNOR OF ONE-HALF TO HARRY EICKHOFF, OF SAME PLACE.

JOURNAL-BEARING.

SPECIFICATION forming part of Letters Patent No. 593,082, dated November 2, 1897.

Application filed August 26, 1897. Serial No. 649,595. (No model.)

*To all whom it may concern:*

Be it known that I, JAMES B. CHRISTOPHER, a citizen of the United States, residing at Peru, in the county of La Salle and State of Illinois, have invented new and useful Improvements in Journal-Bearings, of which the following is a specification.

This invention relates to journal-bearings, and has for its object to provide an improved roller-bearing more especially designed for railway-car axles wherein the antifriction-rollers are maintained out of contact with each other at fixed and uniform distances apart and end thrust of the rollers prevented.

The present invention is in the nature of an improvement on the roller-bearing shown and described in Letters Patent granted to me on the 16th day of March, 1897, and numbered 579,041; and it consists in the improved construction, arrangement, and combination of parts hereinafter described, and particularly pointed out in the claims following the description, reference being had to the accompanying drawings, forming a part of this specification, wherein—

Figure 1 is a perspective view of a car-axle box embodying my invention. Fig. 2 is a longitudinal central section of the same, and Fig. 3 is a transverse section on the line 3 3 of Fig. 2.

Referring to the drawings, the numerals 1 and 2 respectively indicate the corresponding halves of a car-axle box provided at their sides with registering lugs 3, through which are passed bolts 4, that secure the two halves of the box rigidly together. The outer end of the box is closed by a lid 5, hinged to the upper section of the box and normally held closed by a spring 6 and fastened in its closed position by a spring-catch 7, attached to the under side of the lower section of the box and engaging the edge of the lid.

The interior of the box is constructed to form a cylindrical chamber, in which are disposed the axle and rollers, and midway between its ends is provided with an annular groove 8, which is approximately U-shaped in cross-section. The axle 9 is formed on its periphery with a corresponding groove 10, which, when the parts are in position, lies opposite to and registers with the groove 8.

Disposed in the grooves 8 and 10 are a plurality of double balls 11, formed integrally, the adjacent faces of each pair of balls abutting one against the other, and each ball of every pair being provided on its outer face with an axial cylindrical extension 12, forming a roller. The rollers 12 project centrally from the balls 11 in opposite directions and have a rolling bearing on the axle and the interior of the journal-box. The distance between the bottoms or opposite faces of the grooves 8 and 10 is slightly greater than the diameters of the balls 11, whereby the balls do not normally contact with the axle or the journal-box, but each pair of double balls is in contact with the adjacent double balls on each side, whereby the rollers 12 are maintained out of contact with each other and at uniform distances apart.

By forming the balls 11 double or in pairs instead of singly, as shown and described in my said former patent, the rollers 12 are held in absolute parallelism, for the double balls present two points of bearing which will resist any tendency of one end of the roller to run in advance of or lag behind the other end, thus preventing the rollers from binding or wedging between the axle and journal-box. I have also found in practice that the double balls work better than the single balls under a heavy load, that they last longer, as there is not so much wear as there is on the single balls, while at the same time there is no appreciable increase in friction.

By the arrangement described the rollers are free to roll around between the axle and box without having any grinding or rubbing action one upon the other. It will be noted that the rollers do not extend entirely to the ends of the box and are prevented from coming in contact with either end thereof by the balls 11, which, being seated in the grooves 8 and 10, resist any endwise movement of the rollers and receive any end thrust that may be imparted to the latter, and as the weight supported by the axle is sustained entirely by the rollers and as the balls and grooves present no sharp or abrupt edges or angles such end thrust will cause but little friction.

By providing the double balls, as described, the increase in cost over the arrangement shown in my said former patent is merely nominal, while at the same time the efficiency of the bearing is promoted in the manner described.

The use of lubricant in the device is unnecessary.

I have shown and described the invention as applied to a railway-car-axle bearing, but it will be manifest that it can be applied equally as well to bearings of every description.

Having described my invention, what I claim is—

1. In a journal-bearing, the combination with a journal-box having a single annular groove formed on its interior, of a journal arranged in the box and having a single circumferential groove intermediate its ends corresponding to and registering with the groove in the journal-box, and a plurality of integral double balls disposed in said grooves, each pair of balls being in contact with the adjacent balls on each side but normally out of contact with the journal and journal-box and each ball of every pair provided with an axially-projecting roller disposed between the journal and the journal-box, the rollers of each set of balls being unconnected with the rollers of the other balls, substantially as described.

2. In a journal-bearing, the combination with a journal-box having a single annular groove substantially U-shaped in cross-section formed on its interior, of a journal arranged in the box and having a single circumferential groove intermediate its ends corresponding to and registering with the groove in the journal-box, and a plurality of integral double balls disposed in said grooves, each pair of balls being in contact with the adjacent balls on each side, and each ball of every pair being provided with an axially-projecting roller, said rollers projecting in opposite directions between the journal and journal-box and the rollers of each pair of balls being unconnected with the rollers of the other balls, the diameters of the balls being slightly less than the distance between the bottoms or opposite faces of the said grooves whereby the balls are normally out of contact with the journal and journal-box, substantially as described.

In testimony whereof I have hereunto set my hand in presence of two subscribing witnesses.

JAMES B. CHRISTOPHER.

Witnesses:
J. R. YOUNG,
WILLIAM J. SIEGLER.